(12) United States Patent
Ragan

(10) Patent No.: US 12,103,784 B2
(45) Date of Patent: Oct. 1, 2024

(54) OVERHEAD TRAY CONVEYOR AND WASH SYSTEM

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 357 days.

(21) Appl. No.: 17/619,684

(22) PCT Filed: Jul. 22, 2020

(86) PCT No.: PCT/US2020/043077
§ 371 (c)(1),
(2) Date: Dec. 16, 2021

(87) PCT Pub. No.: WO2021/030016
PCT Pub. Date: Feb. 18, 2021

(65) Prior Publication Data
US 2022/0304544 A1    Sep. 29, 2022

Related U.S. Application Data

(60) Provisional application No. 62/885,909, filed on Aug. 13, 2019.

(51) Int. Cl.
*B65G 47/04* (2006.01)
*B65G 13/02* (2006.01)
(Continued)

(52) U.S. Cl.
CPC ............. *B65G 47/04* (2013.01); *B65G 13/02* (2013.01); *B65G 23/23* (2013.01); *B65G 47/61* (2013.01);
(Continued)

(58) Field of Classification Search
CPC ........ B65G 2207/46; B65G 2201/0258; B65G 2812/01; B65G 2207/14; B65G 47/53; B65G 54/02; B65G 47/52; B65G 47/61; B65G 41/61; B65G 23/23; B65G 13/02; B65G 47/04
See application file for complete search history.

(56) References Cited

U.S. PATENT DOCUMENTS 4,090,275 A    5/1978   Jorgensen et al.
4,274,886 A *  6/1981   Noren .................... A47L 15/247
                                                        134/32
(Continued)

FOREIGN PATENT DOCUMENTS

CN    208305096 U      1/2019
GB     2181205 A  *    4/1987    ............... B08B 3/04

OTHER PUBLICATIONS

First Office Action of Chinese Patent Application No. 202080045365X, dated Dec. 12, 2023, China National Intellectual Property Administration.

*Primary Examiner* — Gene O Crawford
*Assistant Examiner* — Lester Rushin, III
(74) *Attorney, Agent, or Firm* — James T. Cronvich

(57) ABSTRACT

An overhead tray conveyor system conveying tray movers holding trays carrying products to a workstation area for processing. Soiled trays are transferred from the tray movers to a wash system. Once sanitized, the trays are returned from the wash system to the tray movers advancing around a track circuit.

21 Claims, 4 Drawing Sheets

(51) Int. Cl.
 *B65G 23/23* (2006.01)
 *B65G 47/61* (2006.01)
 *B65G 54/02* (2006.01)
 B65G 47/53 (2006.01)
(52) U.S. Cl.
 CPC ............. *B65G 54/02* (2013.01); *B65G 47/53* (2013.01); *B65G 2201/0258* (2013.01); *B65G 2207/14* (2013.01); *B65G 2207/46* (2013.01); *B65G 2812/01* (2013.01)

(56) References Cited

U.S. PATENT DOCUMENTS

| | | | |
|---|---|---|---|
| 4,602,403 A | | 7/1986 | Martin |
| 5,203,666 A | * | 4/1993 | Mojden ............. B65G 47/5181 414/416.07 |
| 7,870,945 B2 | | 1/2011 | Mileaf |
| 9,171,034 B2 | * | 10/2015 | Weissman ................. G06F 8/60 |
| 9,181,034 B2 | * | 11/2015 | Peters ..................... B65B 7/164 |

* cited by examiner

OVERHEAD TRAY CONVEYOR AND WASH SYSTEM

BACKGROUND

The invention relates generally to power-driven conveyors and in particular to overhead tray conveyors.

Current methods of processing meat, fish, or poultry require cutting bulk product by hand. For example, the bulk meat is conveyed to an operator who loads the meat onto a tray. The operator then cuts the meat into defined portions on the tray's cutting surface. The tools used to cut the meat can score and scratch the cutting surface. Trays marred by scratched surfaces are difficult to sanitize—especially if the trays are sanitized manually. Biofilms, which are especially difficult to remove, can form on and contaminate the trays.

SUMMARY

One version of a tray conveyor system embodying features of the invention comprises a conveyor having an endless overhead track and a plurality of tray movers. Each tray mover includes a trolley operable to be advanced by the conveyor on the endless overhead track around a circuit and a tray holder suspended from the trolley and operable to releasably hold a tray. A workstation area is disposed along a portion of the circuit at which products on the trays are processed. The tray conveyor system also comprises a wash system that includes an entry, an exit, a tray washer, and a conveyor operable to convey trays through the washer from the entry to the exit. A wash system entry junction is positioned along the circuit downstream of the workstation area at which the trays transfer from the tray holders advancing around the circuit to the entry of the wash system. A wash system exit junction is positioned along the circuit downstream of the wash system entry junction at which the trays transfer back onto the tray holders advancing around the circuit.

One version of a tray conveyor embodying features of the invention comprises a conveyor having an endless overhead track and a plurality of tray movers. Each tray mover includes a trolley operable to be advanced by the conveyor on the endless overhead track around a circuit and a tray holder suspended from the trolley. Each tray mover also includes a connecting member that extends downward from the trolley to a yoke having first and second arms extending downwardly to distal ends. The tray holder has a first tray support rotatably retained in the distal end of the first arm and a second tray support rotatably retained in the distal end of the second arm. A bistable latch latches the first and second tray supports in a stable closed configuration to hold a tray and in a stable open configuration to release or accept a tray.

DETAILED DESCRIPTION

Figure 1A:
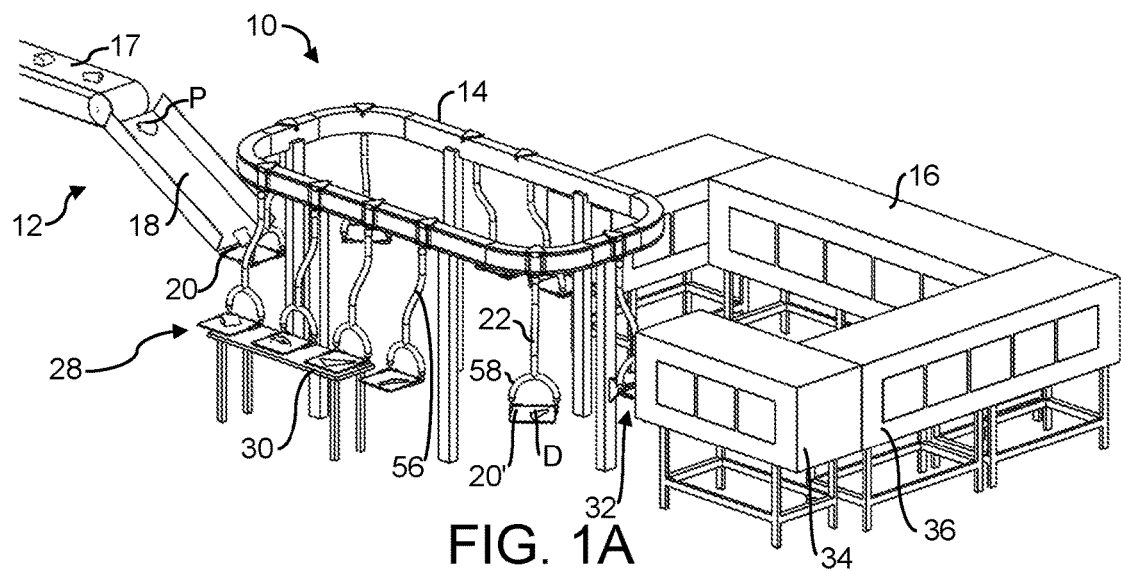
FIGS. 1A and 1B are isometric and top plan views of a tray conveyor system embodying features of the invention including a wash system.
Figure 1B:
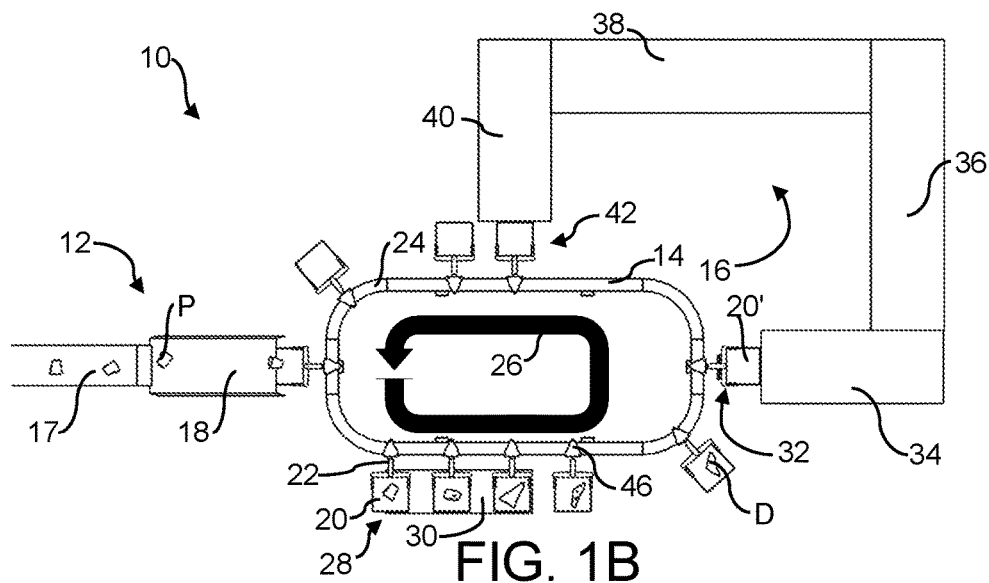

A hygienic tray conveyor system embodying features of the invention is shown in FIGS. 1A and 1B. The tray conveyor system 10 comprises an infeed conveyor 12, an overhead tray conveyor 14 and a wash system 16. In this example the infeed conveyor 12 is shown as a belt conveyor 17 conveying products P, such as meat, fish, and poultry parts, to a chute 18. The products slide down the chute 18 and onto trays 20. Infeed conveyors other than belt conveyors with chutes can be used to feed products P onto the trays 20.

The trays 20 are held by tray movers 22 suspended from and driven in a circuit around an endless overhead track 24 in a conveying direction 26 (counterclockwise in this example). Products P loaded onto the trays 20 are conveyed to a workstation area 28 at which operators butcher or otherwise process the products P and manually remove the processed products from the trays. The workstation area 28 may include a table 30 or other support surface to support the trays 20 during butchering or other processing. Blood and other residual debris (D) soil the trays 20 leaving the workstation area.

The soiled trays 20' are transferred off the tray movers 22 and into the wash system 16 at a wash system entry junction 32. The soiled trays 20' are conveyed through the wash system in a conveyor such as a belt conveyor or a powered roller conveyor. The wash system 16 may include a scraper segment 34 to scrape solid and gelatinous debris from the soiled trays 20', a wash segment 36, a sanitizing and drying segment 38, and a tray accumulation segment 40. The soiled trays 20' are rinsed in the scraper and wash segments 34, 36. Once washed, the trays 20 are sanitized and dried with heat in the sanitizing and drying segment 38. The trays 20 are accumulated in the accumulator segment 40 for re-entry onto the tray movers 22 at a wash system exit junction 42. From the exit junction 42, the clean trays 20 are conveyed to the infeed conveyor 12 to receive new products P.

Figure 2:
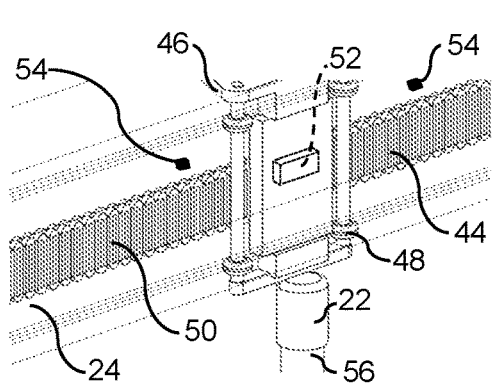
FIG. 2 is an isometric view of an electromagnetically driven trolley for a tray mover usable in a tray conveyor as in FIG. 1A.

The tray movers 22 in this example are driven by an electromagnetic drive 44 in the overhead track 24 as shown in FIG. 2. The tray mover 22 has a trolley 46 that rides around the track 24 on rollers 48. The electromagnetic drive comprises a series of coils 50 that extend along the track 24. The coils 50 are conventionally driven by coil drivers (not shown) under the control of a programmed controller (not shown). The coils 50 produce electromagnetic fields that intersect the trolley 46. One or more permanent magnets 52 in the trolley 46 produce a magnetic field that interacts with the electromagnetic fields of the coils 50 to apply a force to move the trolley along the track 24. In this example the coils form a drive stator of a linear synchronous motor in which the permanent magnet resides in the moving part of the motor. Position sensors 54, such as Hall-effect devices, positioned along the track 24 are used by the controller to determine the positions of the trolley 46. Sensors, wireless communications, and a programmed processor may also be housed in each trolley 46.

Figure 3:
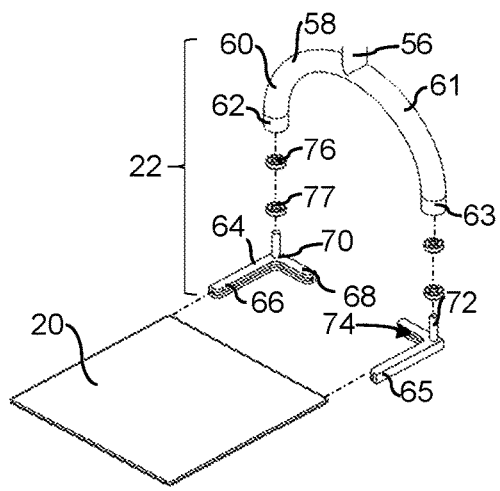
FIG. 3 is an exploded view of a tray holder for a tray mover as in FIG. 2.

A connecting member 56 extends downward from the trolley 46 of each tray mover 22 to a yoke 58 as shown in FIGS. 1A, 2, and 3. The yoke 58 has two arms 60, 61 that terminate in distal ends 62, 63. A pair of tray supports 64, 65 forming a tray holder are rotatably retained in the distal ends 62, 63, of the two arms 60, 61. The tray supports 64, 65 are L-shaped with two legs 66, 68 meeting at a corner 70. The L-shaped tray supports 64, 65 are mirror images of each other. A pivot pin 72 extends from the corner 70 perpendicular to the plane of the L-shaped tray supports 64, 65. A groove 74 sized to receive an edge of the trays 20 is formed along the interior of the L-shaped tray supports 64, 65. Each of the tray supports 64, 65 supports a corner of the trays 20 in the groove 74.

A pair of confronting polymagnets 76, 77 at each distal end 62, 63 of the yoke 58 in the tray mover 22 form a bistable latch for the tray holder. The bistable latch affords the tray holder two stable configurations: (1) a stable closed configuration (as in FIG. 3) for holding a tray 20; and (2) a stable open configuration in releasing or receiving a tray.

Figure 6A:
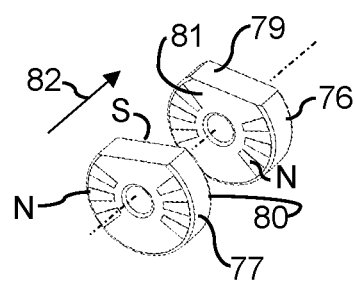
FIGS. 6A and 6B are isometric views of polymagnet pairs used in a bistable latch in the tray holders of FIG. 3.
Figure 6B:
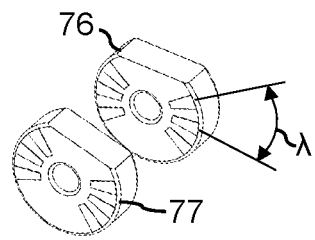

The polymagnets 76, 77 are each in the form of annular disks with a central axial bore 78 as also shown in FIGS. 6A and 6B. Each polymagnet 76, 77 has two opposite faces 80, 81 and a reference flat 79 on its periphery for properly aligning polymagnet pairs to form the latch. In this example the polymagnet has three pairs of diagonally opposite magnetic domains of the same polarity angularly spaced apart by a latch angle A. The magnetic domains form north poles (N) on one of the faces and south poles (S) on the other. The rest of the polymagnet 76, 77 has a magnetic domain of the opposite polarity. All the magnetic domains have magnetic axes 82 parallel to the axis of the bore 78. One of the polymagnets 76 in each pair is affixed to the yoke 58 at the distal end 62, 63 of the arm 60, 61. The other polymagnet 77 is affixed to the corresponding tray support 64, 65. The bottom face 81 of the yoke polymagnet 76 is closely spaced from the top face 80 of the support polymagnet 77 to form the bistable latch with the similarly arranged pair of polymagnets on the other arm of the yoke.

The arrangement of the polymagnet pair 76, 77 in FIG. 6A represents the relative orientations of the magnets at the distal end 62 (FIG. 3) of the tray mover when latched in a stable open configuration. In the stable open configuration, two of the three pairs of poles are aligned. The arrangement of the polymagnet pair 76, 77 in FIG. 6B represents the relative orientations of the magnets at the other distal end 63 (FIG. 3) of the tray mover when latched in the stable open configuration. The relative orientations are opposite each other because the two L-shaped tray supports 64, 65 (FIG. 3) rotate open in opposite directions. The polymagnet pairs 76, 77 are in stable attracting positions only when poles are axially aligned. When the poles are out of alignment while the tray supports are opening or closing, the attractive force is small, or the force is repelling. The polymagnet pairs 76, 77 are shown in a stable configuration shifted by an angle +λ in FIG. 6A and −λ in FIG. 6B from a stable reference configuration of 0° when the tray supports are closed and the reference flats 79 of both pairs and all three of the pairs of poles are aligned. Mechanical stops (not shown) in the tray movers can be used as a redundant limit to the angular position of each of the tray supports to rotational angles in one quadrant: (a) from 0° to +λ as in FIG. 6A; and (b) from 0° to −λ as in FIG. 6B. The tray supports therefore each have an angular rotation range of A between stable positions. The polymagnets 76, 77 have three pairs of equipolar magnetic domains so that the same polymagnets can be used for both tray supports. But polymagnets with a different magnetic-domain pattern could be used for each tray support since they counter-rotate open in opposite directions.

Figure 4A:
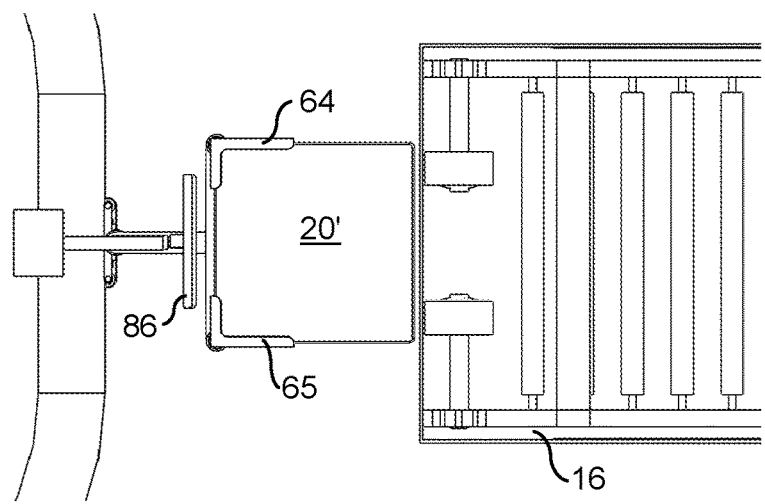
FIGS. 4A-4C are bottom plan views of a wash system entry junction showing the transfer of soiled trays from the tray movers to the wash system of FIG. 1A with the bottom removed for clarity.
Figure 4B:
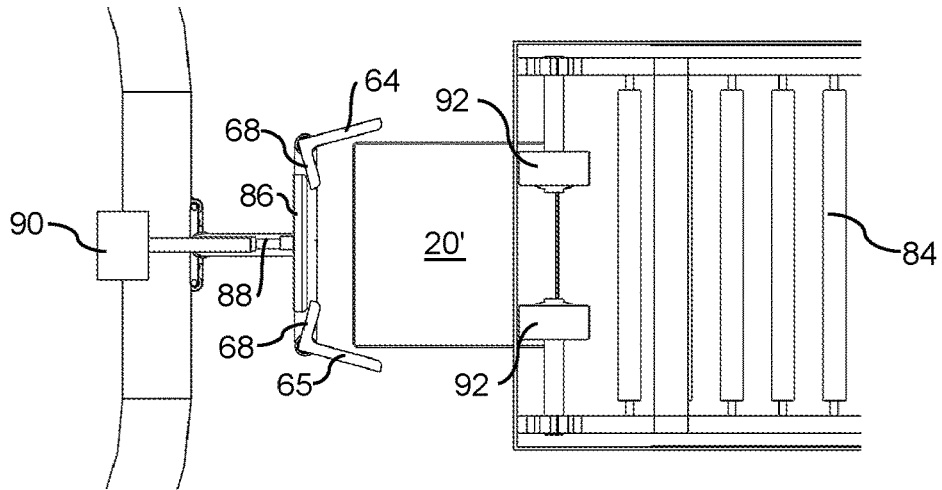
Figure 4C:
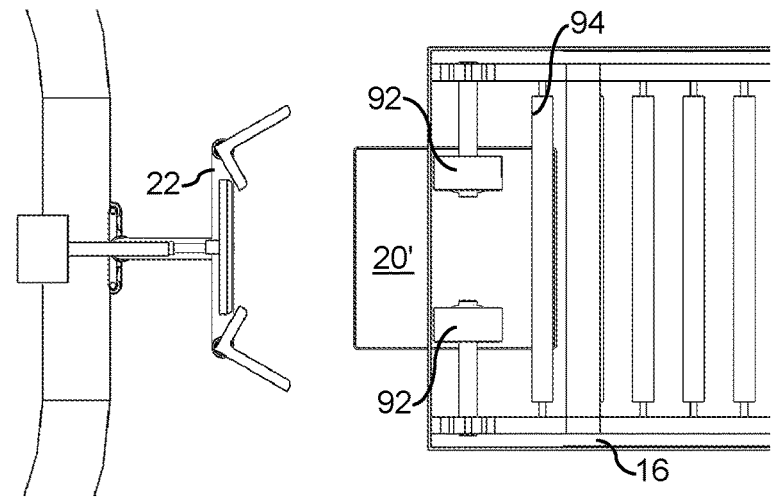

The transfer of a soiled tray 20' to the wash system 16 at the wash system entry junction is shown in sequence in FIGS. 4A-4C. In FIG. 4A the soiled tray 20' entering the junction is held firmly by the two L-shaped tray supports 64, 65 latched by the bistable latch in the closed configuration. When the tray 20' is aligned with a conveyor 84 in the wash system 16, an ejector 86 is pushed by the piston 88 of an actuator 90 against the shorter rear legs 68 of the L-shaped tray supports 64, 65. The force of the advancing ejector 86 against rear legs 68 of the tray supports 64, 65 causes the supports to counter-rotate in opposite directions over an angular range from the latched stable closed configuration of FIG. 4A (0°) to the latched stable open configuration of FIG. 4C (+λ for the trailing tray support 64 and −λ for the leading tray support 65). (In this version the angular rotation range λ for each tray support 64, 65 is about 30°, but could be up to about 90° or less than 30° as set by the magnetic-domain pattern of the polymagnets.) In the transition shown in FIG. 4B, the bistable latch is in an unstable configuration. The ends of the rear legs 68 push the tray 20' into the opening of the wash system 16 where it is grabbed between two pairs of pinch rollers 92 (top pinch roller not shown) and pushed onto the powered rollers 94 of the roller conveyor 84 as shown in FIG. 4C. The emptied tray mover 22 with its tray holder latched in the stable open configuration resumes advancing around the track circuit. The ejector 86 is retracted to a ready position to eject the next soiled tray 20'.

Figure 5A:
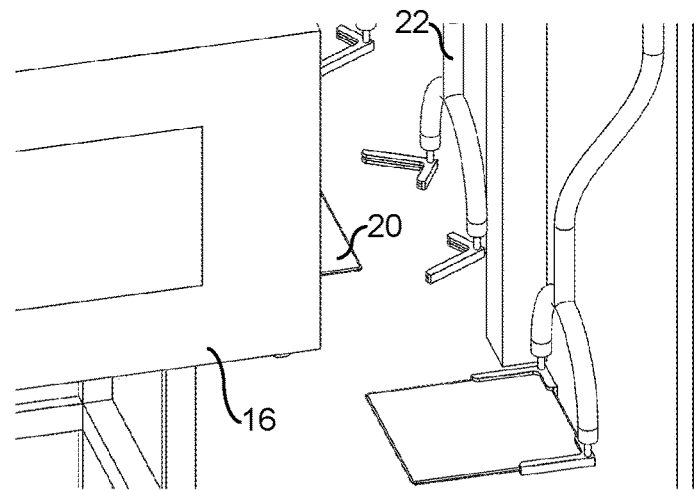
FIGS. 5A-5C are isometric views of a wash system exit junction showing the transfer of washed trays back onto the tray movers of FIG. 3.
Figure 5B:
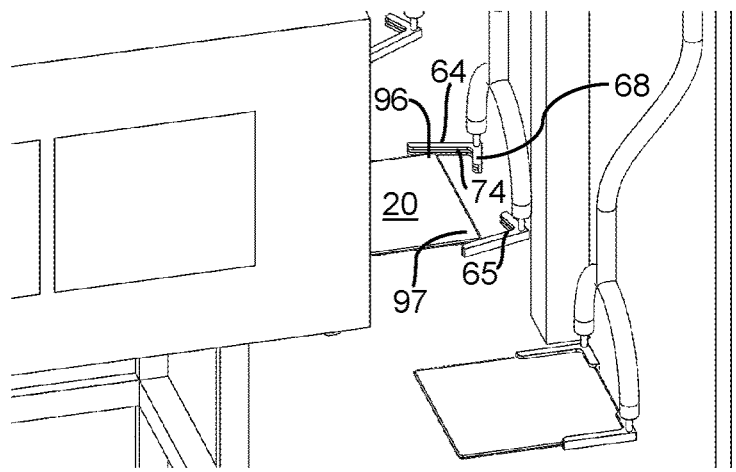
Figure 5C:
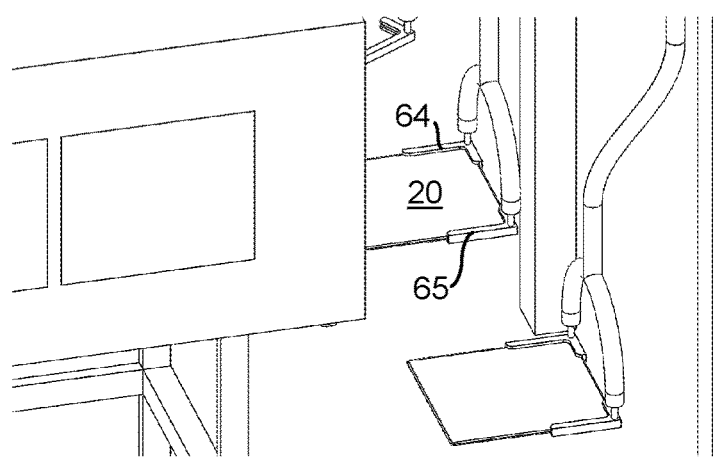

Once a tray 20 is conveyed through the wash system 16 by the conveyor 84 from the wash system entry junction to the wash system exit junction, it is returned to a tray mover 22 as shown in FIGS. 5A-5C. In FIG. 5A the tray holder of a tray mover 22 moving into position at the wash system exit junction is shown in a stable open configuration. As the cleaned tray 20 is pushed far enough out of the wash system 16 by pinch rollers (not shown), its leading corners 96, 97 engage the grooves 74 in the tray supports 64, 65 as shown in FIG. 5B. Eventually the cleaned tray 20 is pushed far enough out of the wash system 16 that its corners 96, 97 push against the rear legs 68 of the tray supports 64, 65 to cause the supports to rotate from the stable open configuration to the stable closed configuration to firmly hold the tray 20, as shown in FIG. 5C. The cleaned tray 20 is then ready to receive another product from the infeed conveyor.

Figure 7:
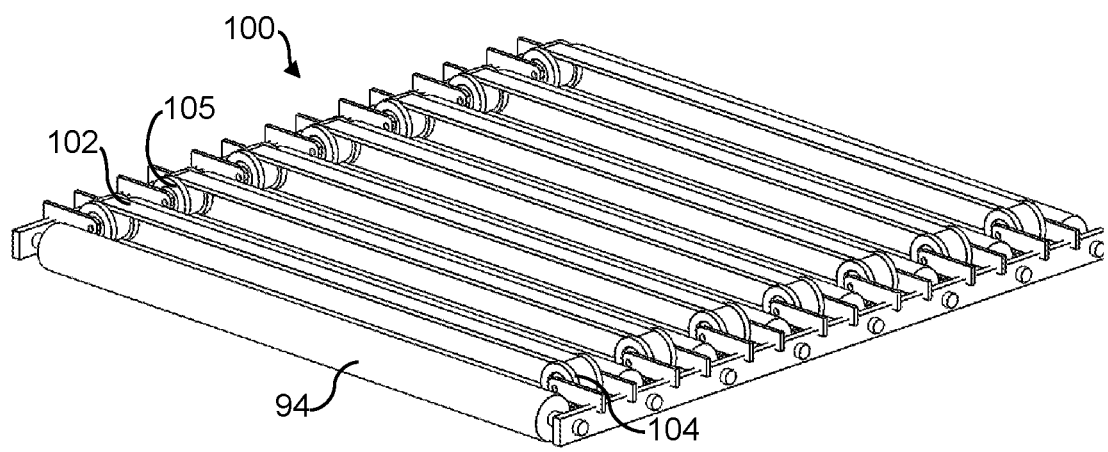
FIG. 7 is an isometric view of a transfer device used to transfer trays 90° in the wash system of FIG. 1A.

The wash system shown in FIG. 1B has three 90° turns to return the trays to the overhead tray conveyor track 24. The 90° turns can be accomplished with a conventional transfer device 100 as shown in FIG. 7. The transfer device has powered rollers 94 alternating with belt bands 102 trained around pop-up drive and idle pulleys 104, 105. When no tray is completely on the transfer device 100, the belt bands 102 are lowered below the tops of the powered rollers 94. When a tray is completely on the transfer device 100, the pop-up pulleys 104, 105 move to a raised position (shown in FIG. 7) in which the belt bands 102 are above the tops of the rollers 94. The tray then rides on the belt bands 102 and exits the transfer device 100 at a right angle to its entry. That is one way of achieving 90° turns in the wash system. Another way is with conventional powered frustoconical rollers arranged to form a turn.

Although the features of the invention have been described in illustrative examples, other versions are possible. For example the overhead tray conveyor does not have to be an electromagnetic conveyor. It could be an overhead chain conveyor advancing the tray movers around the circuit. And bistable latches can be realized without using polymagnets. So, as these few examples suggest, the claims are not meant to be limited to the illustrative features.

What is claimed is:

1. A tray conveyor system comprising:
   a conveyor having an endless overhead track;
   a plurality of tray movers, each including:
      a trolley operable to be advanced by the conveyor on the endless overhead track around a circuit;
      a tray holder suspended from the trolley and operable to releasably hold a tray;
      a yoke having first and second arms extending downwardly to distal ends;
      a connecting member extending downward from the trolley to the yoke;
      wherein the tray holder has a first tray support rotatably retained in the distal end of the first arm and a second tray support rotatably retained in the distal end of the second arm;
      a bistable latch magnetically latching the first and second tray supports in a stable closed configuration to hold a tray and in a stable open configuration to release or accept a tray;
   a workstation area along a portion of the circuit at which products on the trays are processed;
   a wash system including:
      an entry;
      an exit;
      a tray washer;
      a conveyor operable to convey trays through the washer from the entry to the exit;
   a wash system entry junction at a position along the circuit downstream of the workstation area at which the trays transfer from the tray holders advancing around the circuit to the entry of the wash system;
   a wash system exit junction at a position along the circuit downstream of the wash system entry junction at which the trays transfer back onto the tray holders advancing around the circuit.

2. A tray conveyor system as claimed in claim 1 comprising an infeed conveyor positioned along the circuit between the wash system exit junction and the workstation area to feed products onto the trays.

3. A tray conveyor system as claimed in claim 1 comprising an ejector at the wash system entry junction for pushing the trays from the tray holder into the entry of the wash system.

4. A tray conveyor system as claimed in claim 1 wherein the wash system includes pinch rollers at the entry to pull the trays onto the wash system's conveyor from the tray holders at the wash system entry junction.

5. A tray conveyor system as claimed in claim 1 wherein the wash system includes pinch rollers at the exit to push the trays off the wash system's conveyor and onto the tray holders at the wash system exit junction.

6. A tray conveyor system as claimed in claim 1 wherein the wash system's conveyor is a powered roller conveyor.

7. A tray conveyor system as claimed in claim 1 wherein the conveyor comprises an electromagnetic drive including a series of coils forming a stator extending along the endless overhead track and producing electromagnetic fields and wherein the trolleys include permanent magnets having magnetic fields that interact with the stator's electromagnetic fields to produce a force to drive the trolleys along the track.

8. A tray conveyor system as claimed in claim 1 wherein the bistable latch comprises a first polymagnet in each of the first and second arms and a second polymagnet affixed to each of the first and second tray supports and confronting the first polymagnet and wherein the first and second polymagnets attract each other when the first and second tray supports are rotated to the stable open and closed configurations.

9. A tray conveyor system as claimed in claim 1 wherein the first and second tray supports are each L-shaped and have a slot to receive and support a corner of the trays.

10. A tray conveyor system as claimed in claim 9 wherein the first and second tray supports include a pivot pin extending upward from the corner of the L and rotatably retained in the distal ends of the tray holder's first and second arms to rotate about the pivot pin.

11. A tray conveyor system as claimed in claim 1 comprising an ejector at the wash system entry junction arranged with the tray holder to rotate the first and second tray supports of the tray holder from the stable closed configuration to the stable open configuration to release the tray and to push the tray from the tray holder into the entry of the wash system.

12. A tray conveyor system as claimed in claim 1 wherein the wash system includes pinch rollers at the exit to push the trays off the wash system's conveyor and onto the tray holders at the wash system exit junction and wherein the trays entering the tray holders rotate the first and second tray supports of the tray holders from the stable open configuration to the stable closed configuration to hold the trays.

13. A tray conveyor for conveying trays, comprising:
   a conveyor having an endless overhead track;
   a plurality of tray movers, each including:
      a trolley operable to be advanced by the conveyor on the endless overhead track around a circuit;
      a tray holder suspended from the trolley;
      a yoke having first and second arms extending downwardly to distal ends;
      a connecting member extending downward from the trolley to the yoke;
      wherein the tray holder has a first tray support rotatably retained in the distal end of the first arm and a second tray support rotatably retained in the distal end of the second arm;
      a bistable latch magnetically latching the first and second tray supports in a stable closed configuration to hold a tray and in a stable open configuration to release or accept a tray.

14. A tray conveyor as claimed in claim 13 comprising an electromagnetic drive including a series of coils forming a stator extending along the endless overhead track and producing electromagnetic fields and wherein the trolleys include permanent magnets having magnetic fields that interact with the stator's electromagnetic fields to produce a force to drive the trolleys along the track.

15. A tray conveyor as claimed in claim 13 wherein the bistable latch comprises a first polymagnet in each of the first and second arms and a second polymagnet affixed to each of the first and second tray supports and confronting the first polymagnet and wherein the first and second polymagnets attract each other when the first and second tray supports are rotated to the stable open and closed configurations.

16. A tray conveyor as claimed in claim 15 wherein the first and second polymagnets are disks with opposite faces and a flat on a peripheral surface to serve as a reference.

17. A tray conveyor as claimed in claim 15 wherein the first and second polymagnets are annular disks with a central bore and wherein the first and second tray supports have a pivot pin received in the central bores.

18. A tray conveyor as claimed in claim 15 wherein the first and second polymagnets are annular disks with a central bore and wherein the first polymagnets are affixed in distal ends of the first and second arms of the yoke and wherein the second polymagnets are affixed to the first and second tray supports.

19. A tray conveyor as claimed in claim 13 wherein the first and second tray supports are L-shaped and mirror images of each other, wherein each has a first leg and a second leg joined at a corner and a pivot pin at the corner extending perpendicularly from the plane of the L and into the distal ends of the first and second arms of the yoke.

20. A tray conveyor as claimed in claim 19 wherein the first and second legs each have a groove sized to receive an edge of the trays.

21. A tray conveyor as claimed in claim 13 wherein the first and second tray supports are operable to counter-rotate together over a limited range of rotation angles.

\* \* \* \* \*